(12) United States Patent
Wagner et al.

(10) Patent No.: US 7,475,349 B2
(45) Date of Patent: Jan. 6, 2009

(54) INTERACTIVE GRAPHICAL USER INTERFACE FOR TELEVISION SET-TOP BOX

(75) Inventors: Annette Wagner, Los Altos, CA (US); J. Bret Simister, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 448 days.

(21) Appl. No.: 11/043,455

(22) Filed: Jan. 25, 2005

(65) Prior Publication Data

US 2005/0132291 A1    Jun. 16, 2005

Related U.S. Application Data

(62) Division of application No. 09/960,684, filed on Sep. 21, 2001, now Pat. No. 6,871,323, which is a division of application No. 09/205,268, filed on Dec. 4, 1998, now Pat. No. 6,335,736, which is a division of application No. 08/937,630, filed on Sep. 26, 1997, now Pat. No. 6,600,496.

(51) Int. Cl.
*G06F 15/00* (2006.01)
*G06F 13/00* (2006.01)

(52) U.S. Cl. .......................... 715/716; 725/34

(58) Field of Classification Search ............... 715/717, 715/856, 854, 781, 763, 765, 700, 716; 725/34, 725/35

See application file for complete search history.

(56) References Cited

U.S. PATENT DOCUMENTS 5,524,195 A * 6/1996 Clanton et al. ............... 725/61

(Continued)

FOREIGN PATENT DOCUMENTS

| WO | WO 94/13107 | 6/1994 |
|---|---|---|
| WO | WO 97/13368 | 4/1997 |
| WO | PCT/US98/18867 | 9/1998 |

OTHER PUBLICATIONS

EPO, Supplementary Partial European Search Report, Nov. 29, 2005, (6 pp.).

(Continued)

*Primary Examiner*—Kevin Nguyen
(74) *Attorney, Agent, or Firm*—Sonnenschein, Nath & Rosenthal, LLP (57) ABSTRACT

A graphical user interface (GUI) for a television set-top box which includes a web browser. The set-top box has an Internet data connection and is controlled from user inputs entered through a remote control device. The GUI generates menu screens that are superimposed over conventional television video images, so that the user can view browser graphics generated by the GUI while viewing television images in the background. The GUI further provides animated on-screen notifications of the presence of interactive content, such as hypertext links to World Wide Web pages, which may be associated with television content currently being received. The GUI can also provide animated on-screen notifications of other events, such as previously-specified dates and times or the end of a television commercial. A main menu screen includes function buttons which appear to slide back and forth. A two-state progress indicator indicates that a download is in progress and the degree of completeness of a download.

11 Claims, 12 Drawing Sheets

U.S. PATENT DOCUMENTS

| | | |
|---|---|---|
| 5,565,909 A | 10/1996 | Thibadeau et al. |
| 5,589,892 A | 12/1996 | Davis et al. |
| 5,657,049 A | 8/1997 | Ludolph et al. |
| 5,659,366 A | 8/1997 | Kerman |
| 5,760,771 A | 6/1998 | Blonder et al. |
| 5,774,664 A | 6/1998 | Hidary et al. |
| 5,774,670 A * | 6/1998 | Montulli .................... 709/227 |
| 5,818,441 A | 10/1998 | Throckmorton et al. |
| 5,818,935 A * | 10/1998 | Maa ........................... 380/200 |

OTHER PUBLICATIONS

Glenn Krasner, "The Smalltalk-80 Virtual Machine", Learning Research Group, Byte Publication, Inc., Aug. 1981, pp. 300-320.

* cited by examiner

| TV Schedule | 8:11 PM Wed. 9/17 | | |
|---|---|---|---|
| Wed. 9/17 | 8:00 PM | 8:30 PM | 9:00 PM |
| KVIE 2 | 90210 | | Party of 5 △ |
| KRON 4 | Wings | | 3rd Rock △ |
| KPIX 5 | Movie: It's a Wonderful Life | | △ |
| KQED 9 | Live from Lincoln Center | | △ |
| KXTV 10 | Drew Carey 31 | Spin City | Drew Carey Ellen |

FIG. 4

| ☐ TV Schedule | | 8:11 PM Wed. 9/17 | |
|---|---|---|---|
| Wed. 9/17 | 8:00 PM | 8:30 PM | 9:00 PM |
| KVIE  2 | 90210 | | Party of 5 △ |
| KRON  4 | Wings | | 3rd Rock △ |
| KPIX  5 | Movie: It's a Wonderful Life | | △ |
| KQED  9 | Live from Lincoln Center | Spin City | △ |
| KXTV  10 | Drew Carey | | Drew Carey |
| 4 | Wings | | Ellen |

INTERACTIVE GRAPHICAL USER INTERFACE FOR TELEVISION SET-TOP BOX

RELATED APPLICATION

This application is a Divisional of U.S. application Ser. No. 09/960,684, filed on Sep. 21, 2001 now U.S. Pat. No. 6,871,323, entitled "Interactive Graphical User Interface For Television Set-Top Box", which is a divisional of Ser. No. 09/205,268 filed on Dec. 4, 1998, now U.S. Pat. No. 6,335,736, Issued on Jan. 1, 2002, which is a divisional of Ser. No. 08/937,630, filed on Sep. 26, 1997 now U.S. Pat. No. 6,600,496, Issued on Jul. 29, 2003. This patent application is hereby incorporated by reference in its entirety.

FIELD OF THE INVENTION

The present invention pertains to the field of user interfaces. More particularly, the present invention relates to a user interface for accessing interactive content using a set-top box.

BACKGROUND

Two important areas of technology in modern society are computers and television. Computer technology is the basis of one of the most widely used information resources in the world, the World-Wide Web ("the Web"). The Web is a collection of formatted hypertext pages located on numerous computers around the world that are logically connected by the Internet. The Web has become a resource for information relating to almost any subject imaginable. Although advances in personal computers and web browser software have made the Web accessible to a large segment of the population, many people are uncomfortable using personal computers. In contrast, television is a technology with which most people are very familiar and comfortable. Therefore, it is desirable to enable people to receive information from the Internet, particularly the Web, on their television sets.

In addition, television broadcasters and sponsors may wish to notify viewers of when interactive content is available that is associated with a program or commercial (advertisement) they are currently viewing. For example, a sponsor may have a Web site from which viewers can obtain additional information on a product shown in a commercial they are watching. Accordingly, it is desirable to provide an entertaining yet relatively unobtrusive way of notifying users when a television material they are viewing has interactive (Web) content associated with it and a way for the viewer to easily and immediately access that information using their television sets. It is further desirable to provide such features so that the user experiences relatively seamless transitions between viewing conventional television content and interactive (Web) content.

SUMMARY OF THE INVENTION

One aspect of the present invention is a method of generating a user interface. A television signal is received and images are displayed on a display device based on the television signal. In addition, it is determined whether secondary information, that is associated with the television signal, is available. If so, then a notification is displayed on the display device as the images are being displayed.

Another aspect of the present invention is a method of generating a user interface in a processing system, in which an input window is initially displayed on a display device. The input window includes a number of icons located substantially adjacent to each other along a coordinate axis. A user input selecting one of the icons is received. In response to the user input, the input window is redisplayed so that at least one of the icons appears to be shifted in position along the coordinate axis. Information corresponding to the selected icon is then displayed adjacent to the selected icon along the coordinate axis.

Another aspect of the present invention is a method of displaying information describing a state of communication of data between two processing systems. An object is displayed on a display device. The object has a first subset and a second subset. A visually perceivable change is caused upon the first portion of the object to indicate that a communication link has been established between the first and second processing systems, and a visually perceivable change is also caused upon the second portion of the object to indicate a degree of completeness of a communication between the first and second processing systems.

Another aspect of the present invention is a method of generating a user interface, in which first window is displayed on a display device, and a second window is then displayed on the display device such that the first and second windows appear to move along a common axis.

Another aspect of the present invention is a method of generating a user interface in a processing system that can be connected to a television set. The processing system is for enabling a user to access a wide area computer network using the television set as a display device. In the method, an input field is displayed in a first portion of a display area of the television set. The input field is for allowing the user to enter characters to specify a function of the processing system which the user wishes to access. A menu is also displayed in a second portion of the display area while the input field is displayed. The menu specifying functions of the processing system.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A user interface for accessing interactive content using a set-top box connected to a television set is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram or other symbolic form in order to facilitate description of the present invention.

Overview

The present invention is included in a "set-top" box which can be connected to a conventional television set and controlled by a hand-held remote control device. The set-top box provides a graphical user interface (GUI) by which a user can easily access both standard television programming and interactive content using the conventional television set as an audiovisual output device. As will be described below, the GUI includes features which provide relatively seamless transitions between viewing television and interactive content, and which enhance the overall viewing experience for the user.

For purposes of this description, the term "interactive content" may refer to any of various types of information that a user can access on demand, such as Web pages and other hypertext-based documents, audio, and video, any of which may originate from the Internet or any other remote source. Some interactive data may be embodied in a conventional hypertext language, such as Hypertext Mark-up Language (HTML). The box includes Web browser software to allow the user to access and download interactive content.

Figure 1:
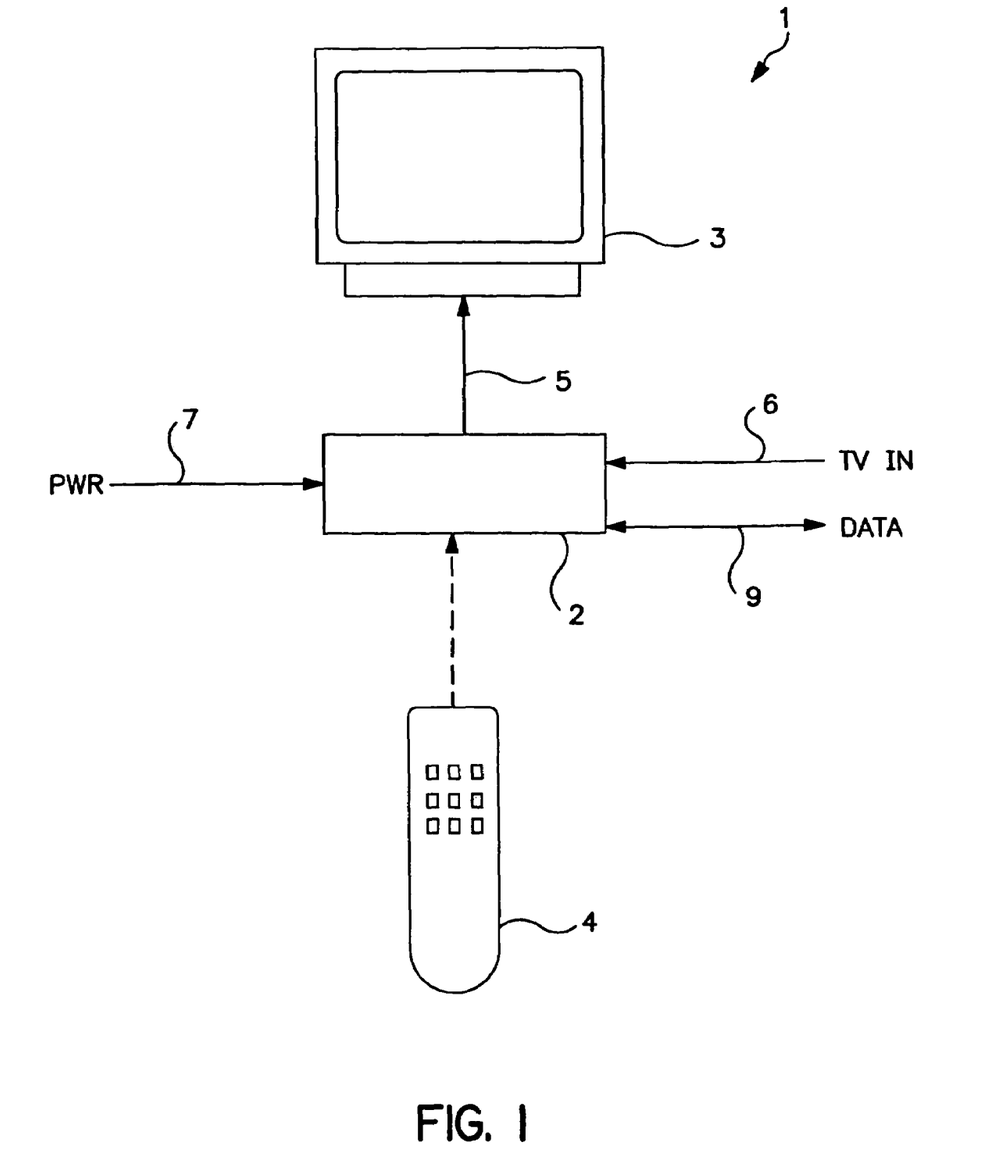
FIG. 1 illustrates a processing system in which a set-top box receives inputs from a remote control and provides outputs to a television set.

FIG. 1 illustrates a system 1 which includes the set-top box of the present invention. The set-top box 2 (hereinafter "the box 2") is connected to a conventional television set 3 via a transmission line 5. Television signals are received by the box 2 via transmission line 6, which may be connected to either an antenna or a cable television outlet. The box 2 receives conventional AC power through line 7. The box 2 receives user inputs entered from a handheld remote control 4 over a wireless link. The wireless link may be an infrared (IR) link, a radio frequency (RF) link, or any other suitable type of link. A high speed, bi-directional data path 9 is provided to the box 2, through which the box 2 can access the Internet.

The GUI of the present invention is presented to the user on television set 3. The user generally interacts with the GUI by entering inputs from the remote control 4. Data indicating the availability of interactive information, such as a Web site, may be provided to the box 2 via the television input 6 or via the bi-directional data path 9. User inputs for accessing interactive content are processed by the box 2 which, in response, transmits outputs onto data path 9. The interactive content is also downloaded to the box 2 via data path 9.

Figure 2:
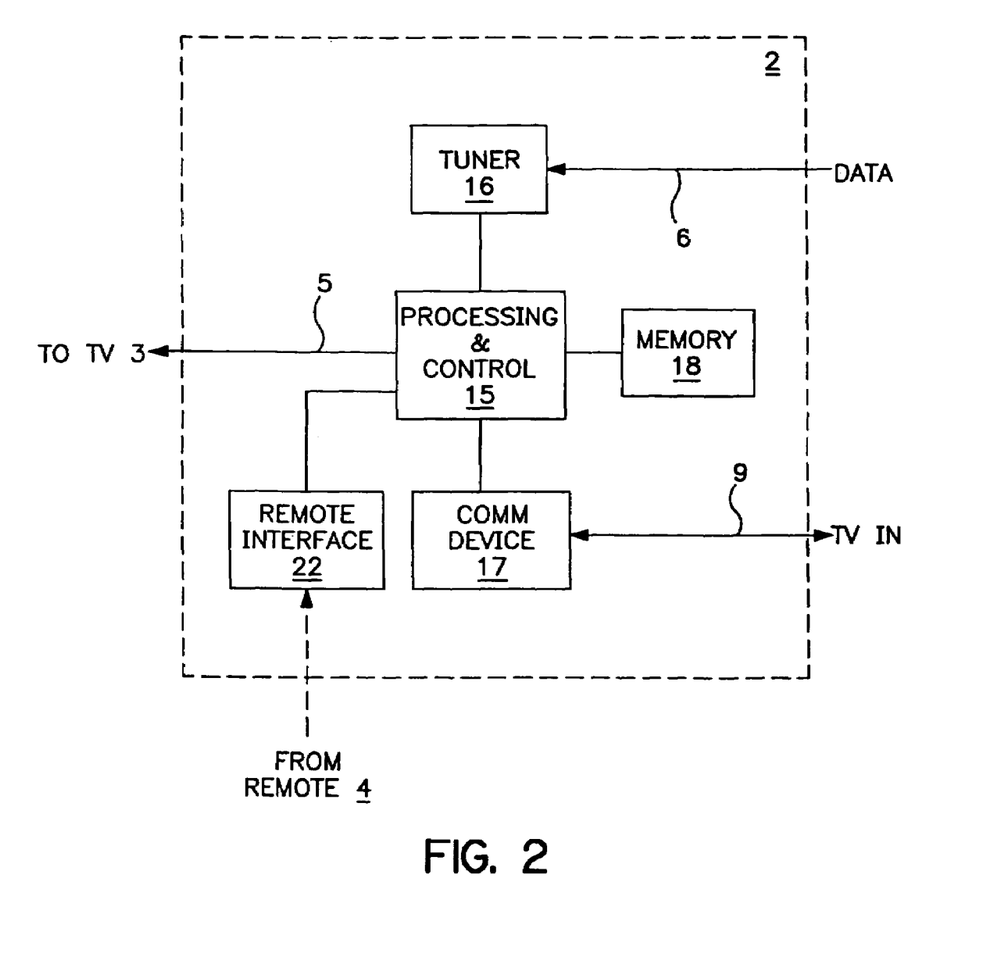
FIG. 2 is a block diagram illustrating internal components of the set-top box of FIG. 1.

FIG. 2 illustrates a block diagram of the internal components of box 2. Note that FIG. 2 is intended to be a conceptual diagram and does not necessarily reflect the exact physical construction and interconnections of these components. The box 2 includes processing and control circuitry 15, which controls the overall operation of the system 1. Coupled to the processing and control circuitry 15 are a television tuner 16, a memory device 18, a communication device 17, and a remote interface 22. The television tuner 16 receives the television signals on transmission line 6, which, as noted above, may originate from an antenna or a cable television outlet. Processing and control circuitry 15 provides audio and video output to the television set 3 via line 5. The remote interface 22 receives signals from the remote control 4 via the wireless connection. The communication device 17 is used to transfer data between the box 2 and one or more remote processing systems, such as a Web server, via data path 9.

The processing and control circuitry 15 may include one or more of devices such as general-purpose microprocessors, digital signal processors (DSPs), application specific integrated circuits (ASICs), various types of signal conditioning circuitry, including analog-to-digital converters, digital-to-analog converters, input/output buffers, etc.

The memory 18 may include one or more physical memory devices, which may include volatile storage devices, non-volatile storage devices, or both. For example, memory 18 may include both random access memory (RAM), read-only memory (ROM), various forms of programmable and/or erasable ROM (e.g., PROM, EPOM, EEPROM, etc.), flash memory, or any combination of these devices.

The communication device 17 may be a conventional telephone (POTS) modem, an Integrated Services Digital Network (ISDN) adapter, a Digital Subscriber Line (xDSL) adapter, a cable television modem, or any other suitable data communication device.

Note that in various other embodiments, other components may be added to the system 1, either as components of the box 2 or as peripheral devices. Such components might include, for example, a keyboard, a mass storage device, or a printer. Such components may be connected via a physical connection or by a wireless connection (e.g., a wireless keyboard).

The present invention includes steps which, in various embodiments, may be carried out by elements of the processing and control circuitry 15 (e.g., a microprocessor or a DSP) executing sequences of instructions. The instructions may be stored in a memory, such as memory 18. Software instructions may be loaded into the box 2 from another device, such as a remote computer system, over data path 9. In various embodiments, downloaded software instructions may be directly supported by the box 2, in which case execution of the instructions may be performed directly upon their being received. In other cases, downloaded instructions may not be directly executable by the box 2. Under these circumstances, the instructions may be executed using an interpreter, which interprets the instructions, or by otherwise executing instructions which convert the received instructions to instructions that can be directly executed.

Certain embodiments of the present invention may be carried out by hard-wired circuitry, rather than by executing software, or by a combination of hard-wired circuitry with software. Hence, it will be recognized that the present invention is not limited to any specific combination of hardware circuitry and software, nor to any particular source for software instructions.

Nonetheless, to facilitate description it is henceforth assumed that aspects of the present invention are generally carried out through the execution of software instructions within the box 2. It is envisioned that these instructions may be written in the Java™ programming language (hereinafter "Java") and, more specifically, in the PersonalJava™ subset of Java (hereinafter "Personal Java"), both developed by Sun Microsystems, Inc, of Palo Alto, Calif. Note, however, that other languages may be substituted within the scope of the present invention. As is well known, Personal Java is a Java application environment designed specifically for network-connectable applications on consumer devices. The details of developing software in Java and Personal Java are well-known to those skilled in the relevant art and are not required for an understanding of the present invention. Accordingly, such details are not provided herein.

The use of Java has a number of advantages, including allowing the GUI to be hardware-independent. Moreover, various features and functions described herein can be added to the portable box 2 at virtually any time after the product is manufactured or purchased by simply downloading the appropriate instructions to the box 2.

The features of the present invention will now be described in greater detail with reference to FIGS. 3 through 8C. These features are described primarily in terms of the outputs that are perceivable to the user. The precise manner in which these functions are implemented, or "coded", is not important for an understanding of the present invention. Many implementations are possible within the scope of the present invention, and such implementations will be readily appreciated from this description by one skilled in the relevant art.

Figure 3:
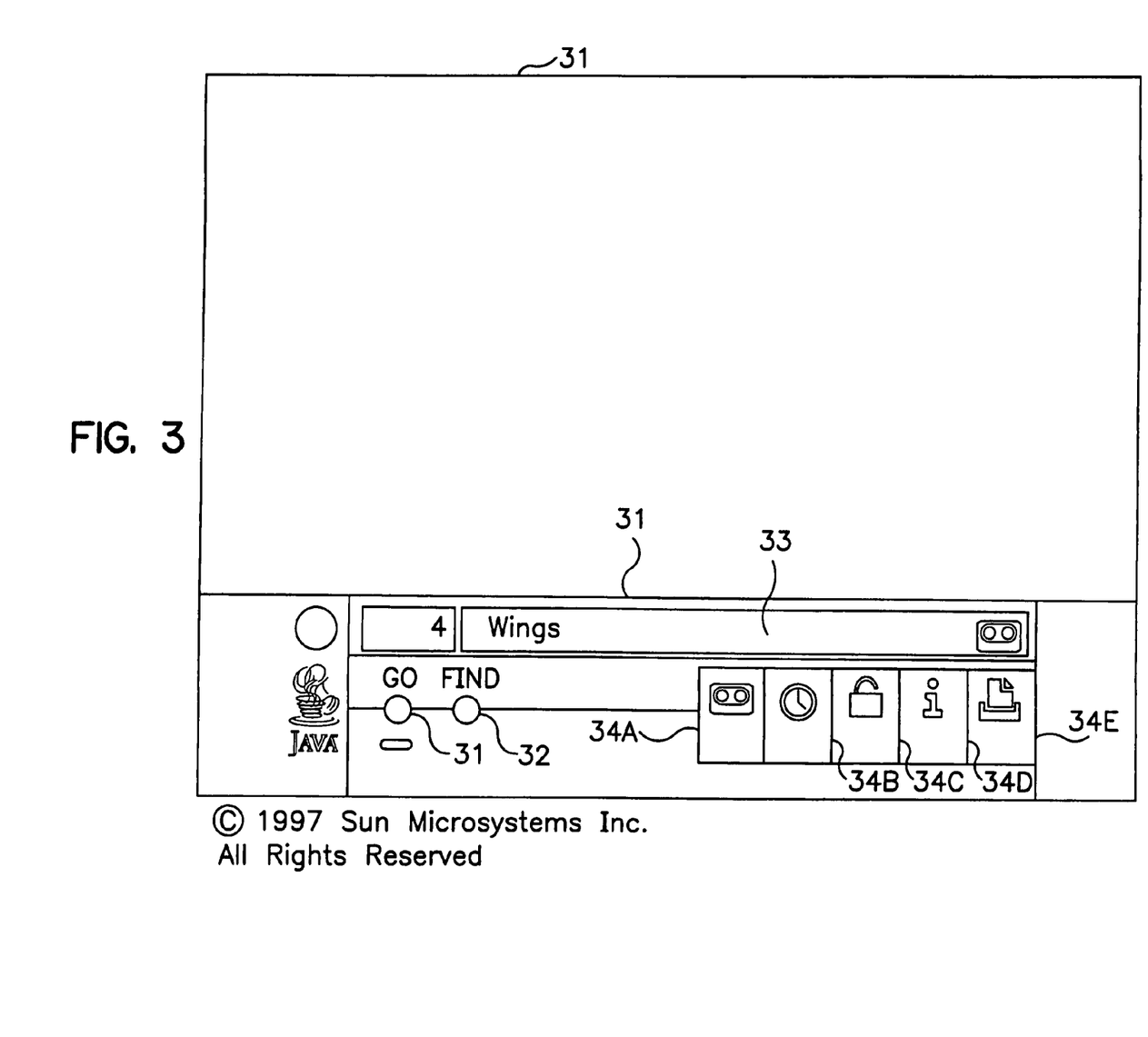
FIG. 3 illustrates a display screen, including a browser panel, as displayed on a television set.

FIG. 3 illustrates a display screen 30 generated by the GUI of the present invention. The screen 30 includes a browser panel 31, which may be thought of as the main menu screen for accessing the various functions provided by the box 2. The browser panel 31 is designed to occupy only a portion of the display screen 30, so that other content, including conventional television images, can also be viewed while the browser panel 31 is displayed. If desired, the browser panel 31 and its contents can be made partially transparent by appropriately setting the corresponding alpha (transparency) factor. The browser panel 31 includes a number of images and icons which represent controls for controlling the GUI. These controls include a Go button 31, a Find button 32, and function buttons 34A, 34B, 34C, 34D and 34E. Browser panel 31 also includes a display area 33 for displaying textual information to the user. Using the system of the present invention, the user manipulates the physical controls on remote control 4 to select and activate the "soft" controls in the browser panel 31 and other controls provided by the GUI. For example, the user may press buttons on the remote control to select and activate any of buttons 31, 32 and 34A through 34E. Note that, except as discussed below, the particular functions associated with these buttons are not germane for purposes of understanding the present invention and are therefore generally not described herein.

Figure 4:
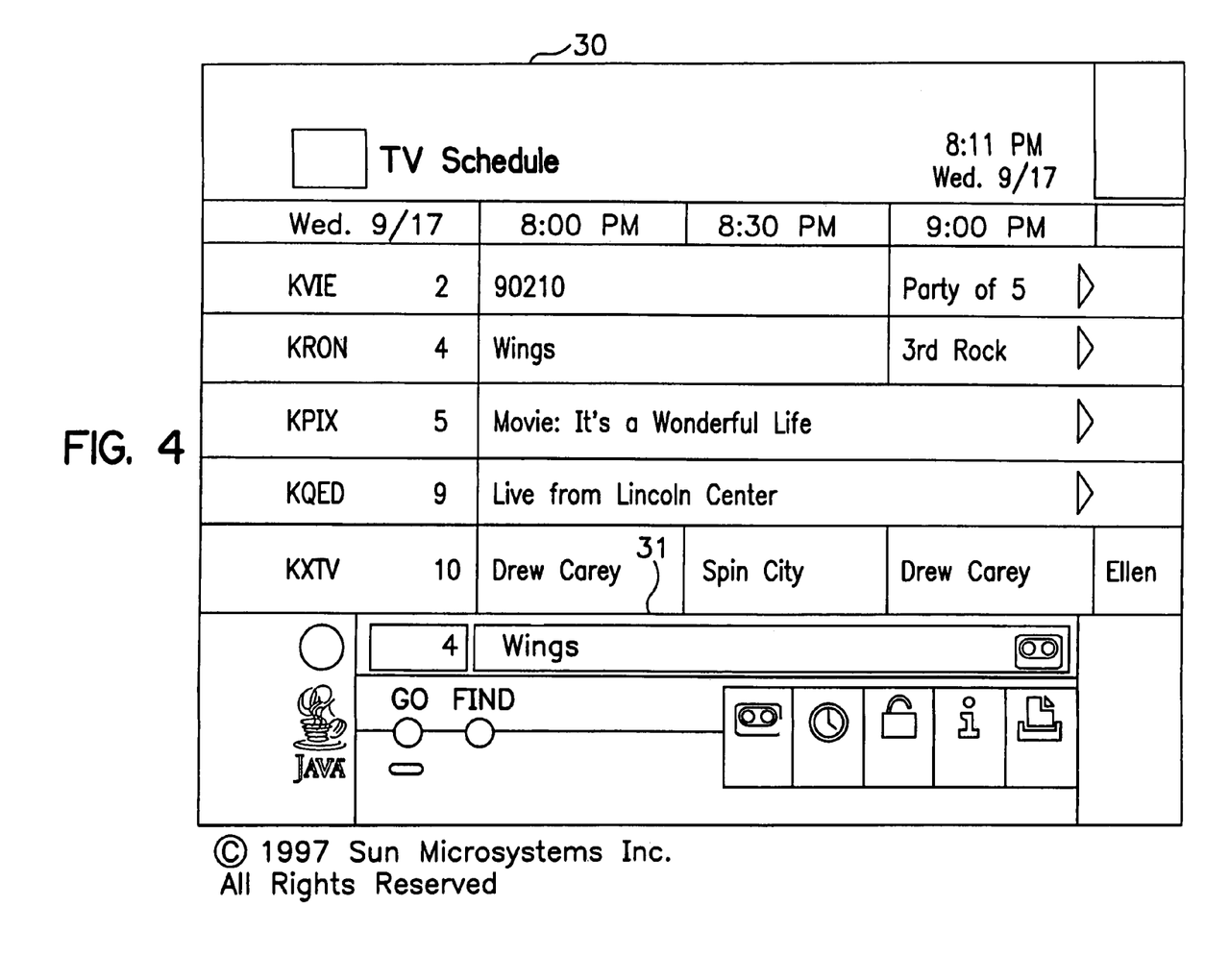
FIG. 4 illustrates a display screen in which a browser panel is superimposed on an interactive program guide.

The GUI allows the user to easily access either conventional television programming and interactive content, such as Web pages. FIG. 4 illustrates an example in which the system is displaying interactive content. In FIG. 4, an interactive programming guide, such as may be found on a Web site, is displayed on screen 30. The browser panel 31 is superimposed over the lower portion of the programming guide.

Sliding Menu Buttons

Figure 5:
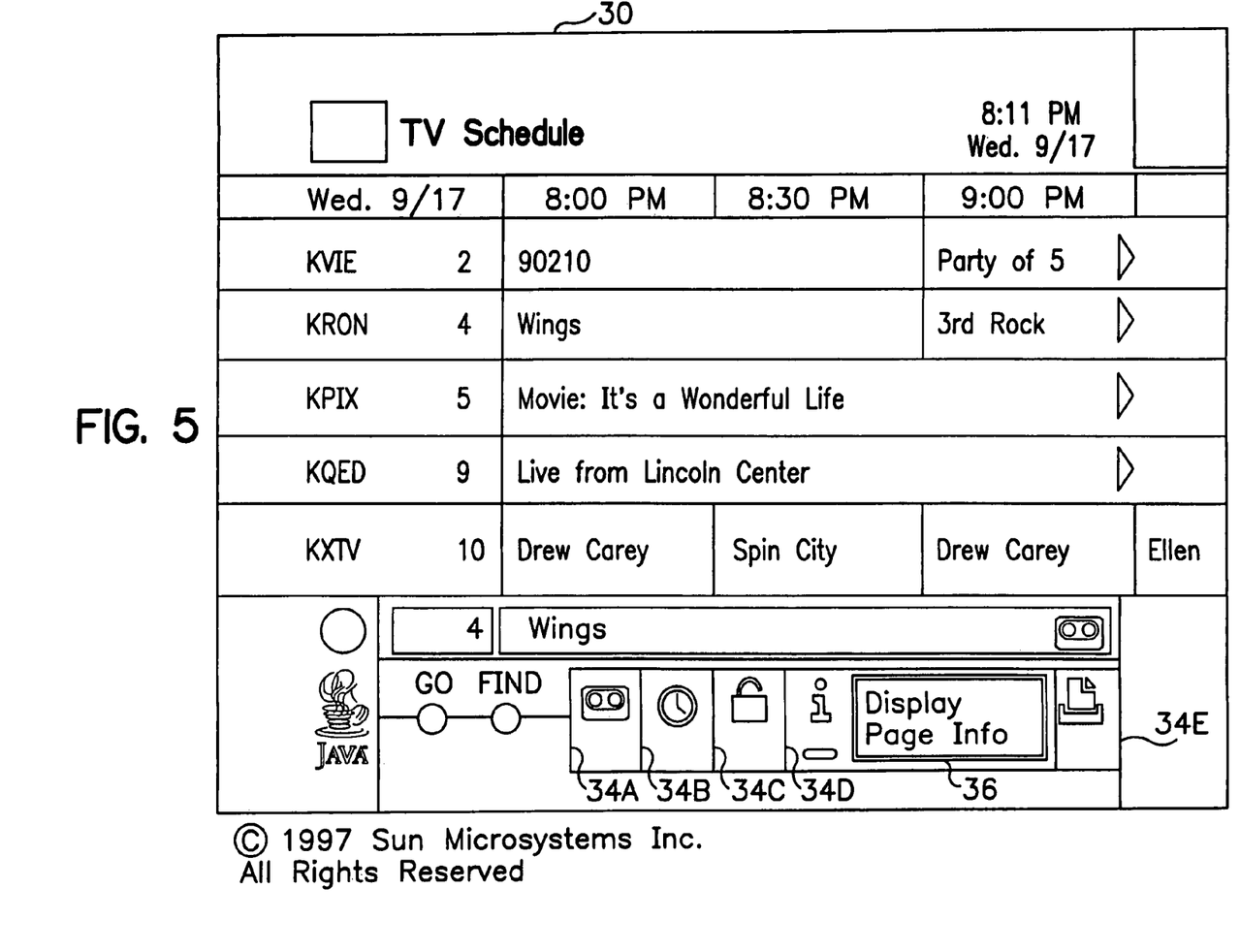
FIG. 5 illustrates a display screen in which a menu button on the browser panel has been selected.

The GUI of the present invention allows the user to view and select the menu buttons 34A through 34D in a manner which effectively uses the limited space on the television screen 30. As shown in FIG. 4, buttons 34A through 34E are normally displayed adjacent to each other along a horizontal axis (not shown). Further, buttons 34A through 34E are normally displayed without any textual description of their associated functions. However, the user can easily view a text description of the function associated with any of these buttons by selecting the button using the remote control 4. As shown in FIG. 5, button 34D is currently selected. By only displaying these descriptions when a particular button is selected, the GUI reduces clutter in the main menu screen.

When one of buttons 34A through 34E is selected, a window containing a brief text description of the function associated with that button appears adjacent to the selected button. Window 36 includes the description "Display Page Info." associated with button 34D. Also, when one of buttons 34A through 34E is selected, the selected button and each of the buttons to one side of the selected button appear to slide horizontally to make room for the text description of the selected button. Thus, in the example of FIG. 5, because button 34D has been selected, each of buttons 34A through 34D appears to have slid to the left to make room for window 36; however, button 34E remains in its previous position. Similarly, if button 34C had been selected, then each of buttons 34A through 34C would appear to slide to the left to make room for the text description of button 34C, while buttons 34D and 34E would remain in their normal positions.

On-Screen Notifications

The GUI of the present invention also provides an entertaining yet relatively unobtrusive way of notifying a user when interactive content can be accessed in relation to material he is currently viewing on the television screen. Such interactive content may include the Web site of a sponsor whose commercial is currently being viewed, for example. The client box 2 may receive data indicating the presence or availability of such interactive content via the television input 6. More specifically, such data may be included within the vertical blanking internal (VBI) of the received television signal. Alternatively, such information may be provided on the data path 9.

Figure 6:
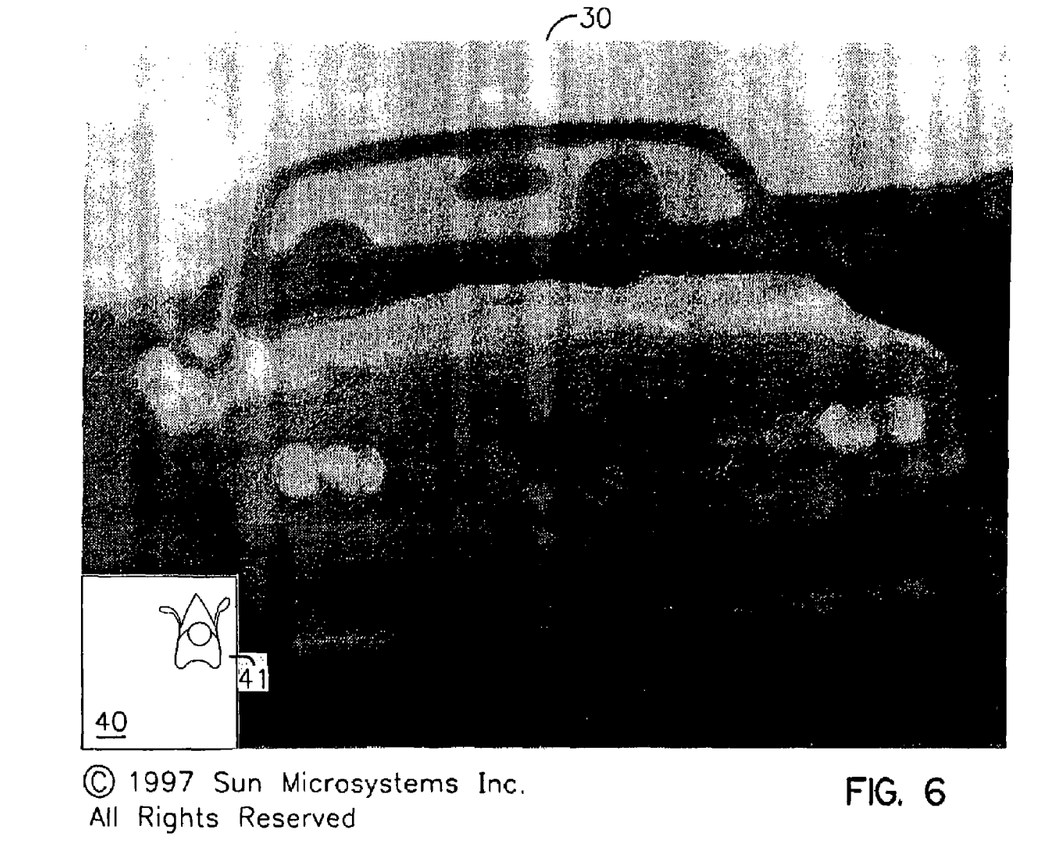
FIG. 6 illustrates a display screen in which an animated character provides an on screen notification.

Referring now to FIG. 6, when the presence or availability of interactive content is detected by the box 2, a window 40 is opened in the corner of the display screen 30. The window 40 includes a small, animated character 41, which moves in order to gain the user's attention. In one embodiment, the character 41 is a cartoon-like character, as illustrated, which appears to waive its "arms" to attract the user's attention. Note that the window 40 and the animated character 41 are superimposed over the standard television images or whatever else the user happens to be viewing at the time. By adjusting the alpha factor appropriately, window 40 or character 41 or both can be given a transparency effect, if desired.

Figure 7:
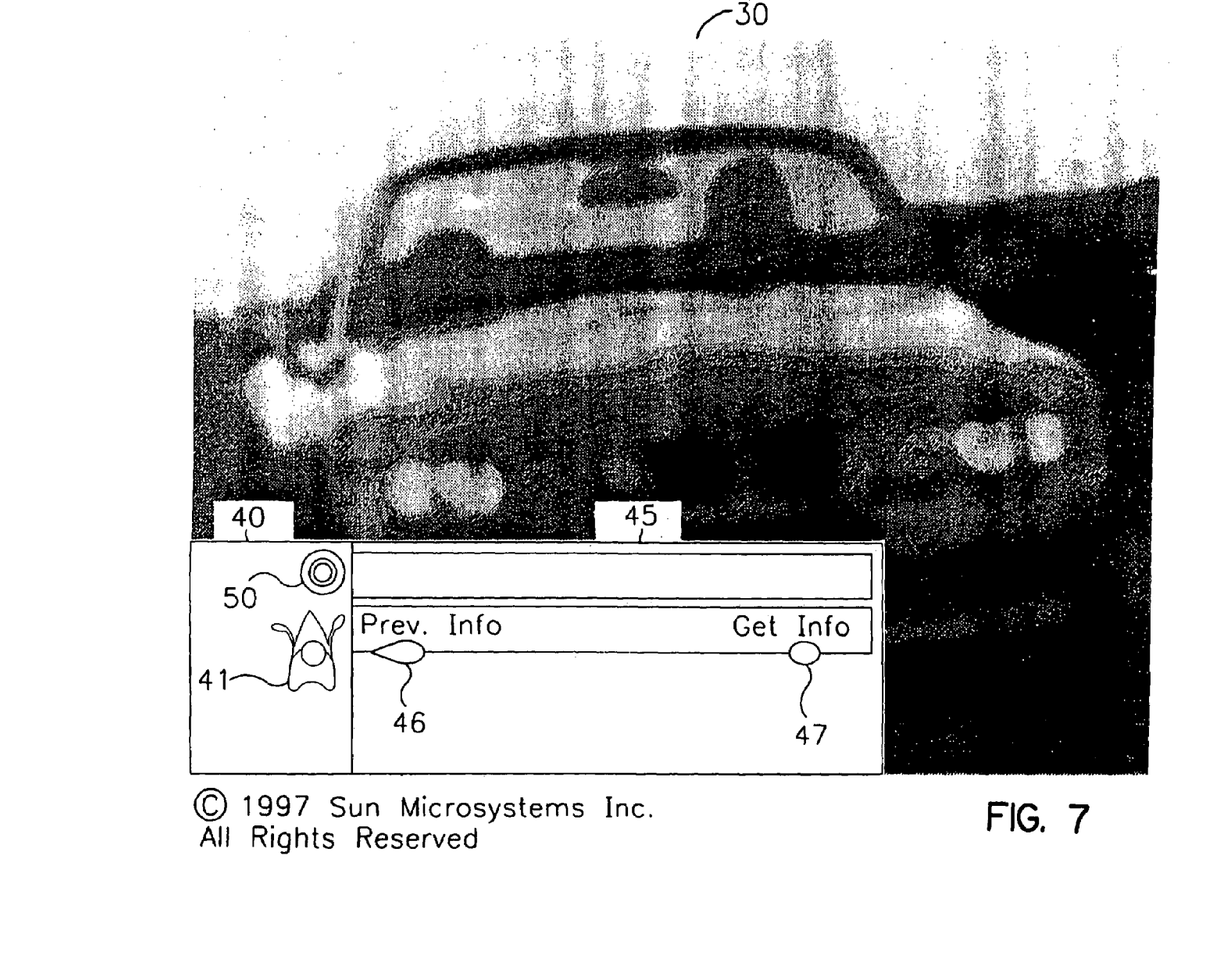
FIG. 7 illustrates a display screen which includes an animated on-screen notification, a progress indicator, and an information panel for accessing interactive content.

In response to the on-screen notification, the user can access the interactive content by pressing a button on remote control 4 to cause an information panel 45 to appear, as shown in FIG. 7. The information panel 45 includes two buttons, a Previous Info button 46 and a Get Info button 47. By activating the Get Info button 47, the user enters the command to download the interactive content about which he has just been notified. The Previous Info button 46 can be activated to access a list of the past several sets of interactive data (e.g., the past several Web pages) for which a notification has been received, from which the user can access any of these sets.

The animated on-screen notification (e.g., animated character 41) can also be used to alert the user to various other events and conditions. For example, the on-screen notification can be used to notify the user that a commercial is ending and a program he had been watching is resuming. Hence, this feature prevents the user from inadvertently missing parts of his favorite program if he becomes preoccupied with viewing interactive content during the commercial. Note that techniques for detecting the end of a commercial segment are known in the video processing arts.

The on-screen notification also can be programmed by the user to occur at a specific date and time, e.g., to alert the user that a specific program is starting. This feature may be integrated with the interactive program guide (see FIG. 4). For example, the user may select a time slot from the displayed program guide and then enter an input to program the on-screen notification to occur just before the beginning of that time slot.

Progress Indicator

Referring again to FIG. 7, when the information panel 45 is activated, a progress indicator 50 appears in window 40. The progress indictor 50 is a two-state indicator; that is, one part of indicator 50 indicates the fact that a connection (communication link) has been established with the remote server (i.e., the Web server), and another part indicates the fact that a download is in progress and the degree of completeness of the download. Refer now to FIGS. 8A, 8B, 8C and 8D, which illustrate the appearance of the progress indicator 50 at various stages of a download. Specifically, FIGS. 8A, 8B, 8C and 8D illustrate four frames (not necessarily consecutive) in an animated sequence, in which the sequence progresses chronologically from the leftmost image to the rightmost image, i.e., from FIG. 8A to FIG. 8D. It will be recognized that the intent is to convey to the user the impression of a smooth-flowing animation sequence, rather than a series of discrete images. It will also be appreciated that the actual animation sequence will likely use many more frames than are shown in FIGS. 8A, 8B, 8C and 8D.

The indicator 50 includes two essentially concentric circles, including an inner circle 52. After the Get Info button 47 being activated, a colored stripe 51 will begin moving around the inner periphery of indicator 50 (i.e., the area outside the inner circle 52) when the connection has been established. In addition, as the interactive data is downloaded from the remote site, the inner circle 52 of indicator 50 appears to "fill up" with color. In one embodiment, the inner circle 52 appears to fill up with color in a clockwise direction in a manner similar to a clock hand going around the face of the clock. In other words, color appears to sweep around the inner circle 52 in a radial arc.

Figure 8A:
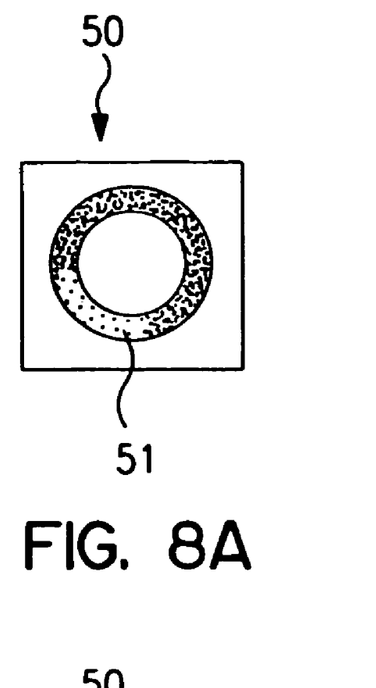
FIGS. 8A, 8B, 8C and 8D illustrate a progress indicator at various stages of an animated sequence.
Figure 8B:
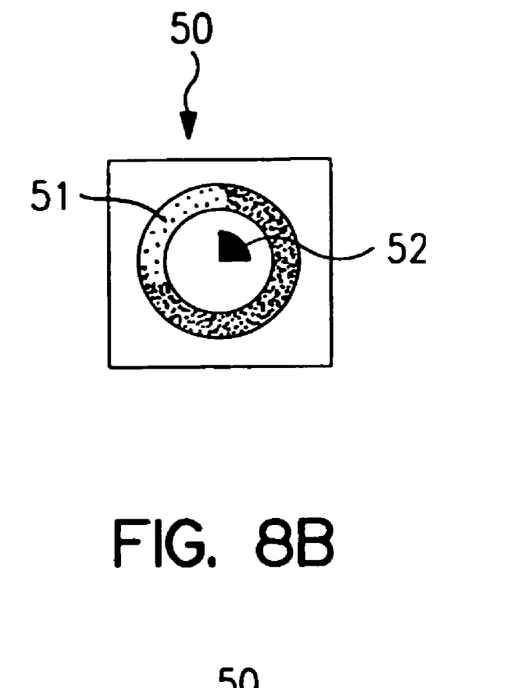
Figure 8C:
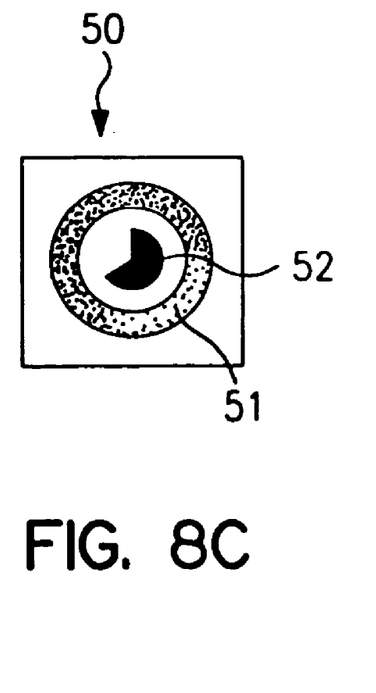
Figure 8D:
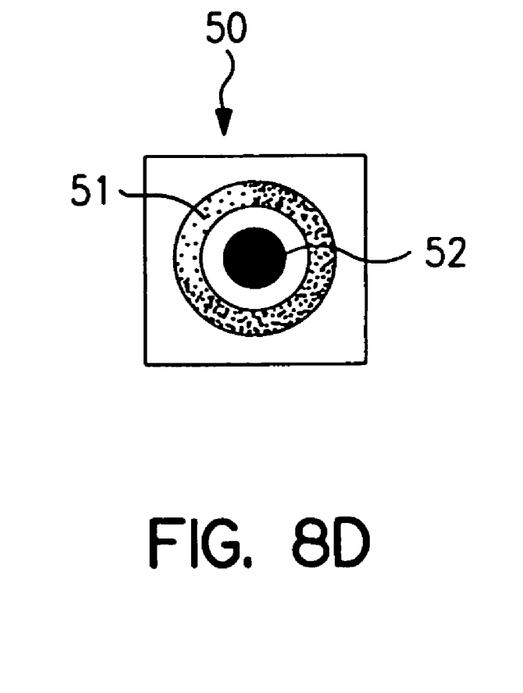

FIG. 8A shows the appearance of progress indicator 50 before the download has begun. In this case, the inner circle 52 of indicator 50 is unfilled (e.g., black) and color stripe 51 of indicator 50 is stationary. FIG. 8B shows the progress indicator 50 when the download is approximately 25 percent complete; in that case, the inner circle 52 appears to be approximately one-quarter filled, i.e., from the "twelve o'clock" position to the "3 o'clock" position. In addition, the color stripe 51 at this stage will appear to be circling around the outside of inner circle 52 in a clockwise direction. FIG. 8C shows the progress indicator 50 when the download is approximately two-thirds complete; in that case, the inner circle 52 in the third image appears to be approximately two-thirds-filled, i.e., from the "twelve o'clock" position to the "8 o'clock" position. The color stripe 51 at this third stage will still appear to be circling clockwise around the outside of inner circle 52. FIG. 8D shows the progress indicator 50 when the download is complete; in that case, the inner circle 52 in the third image appears to be completely filled with color and the color stripe 51 will appear to be stationary.

Sliding Dialog Boxes.

Referring again to FIGS. 3 and 7, the user may open the information panel 45 while the browser panel 31 is currently displayed. In that case, the information panel 45 will appear to slide onto the screen from left to right and will further appear to "push" the browser panel 31 out of the way to the right. In one embodiment, most of the browser panel 31 will disappear off the right edge of the screen, except for the Go button 31 and Find button 32.

Figure 9A:
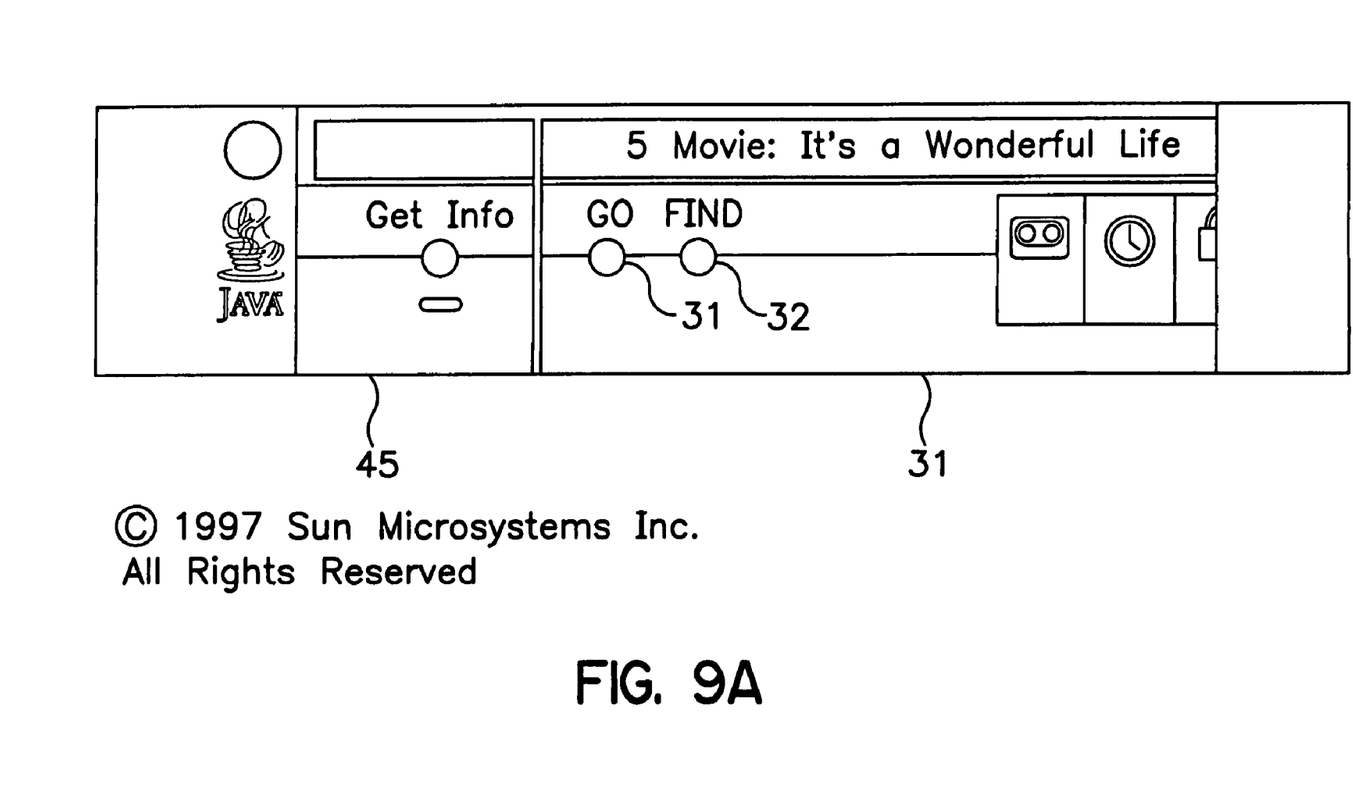
FIGS. 9A, 9B and 9C illustrate an animated sequence showing sliding panels.
Figure 9B:
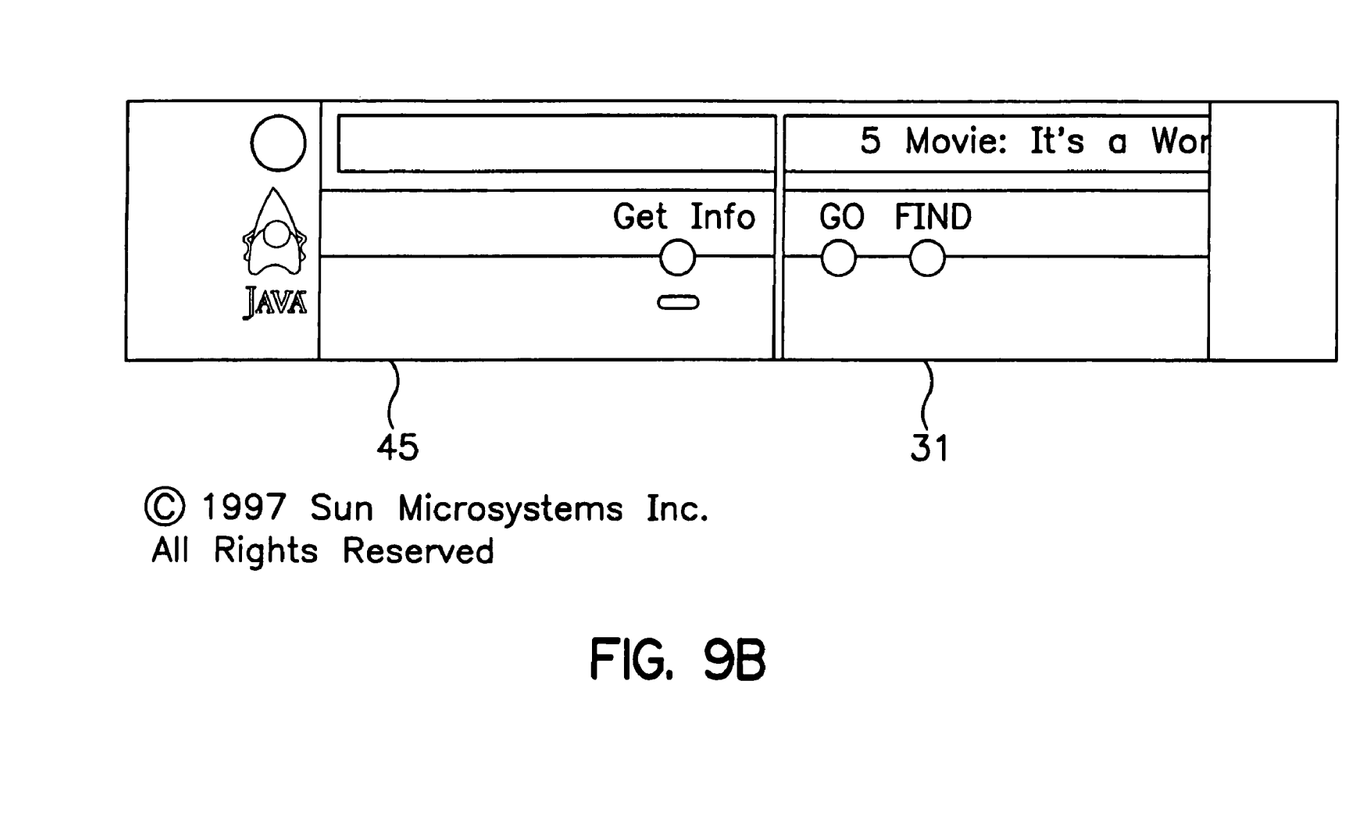
Figure 9C:
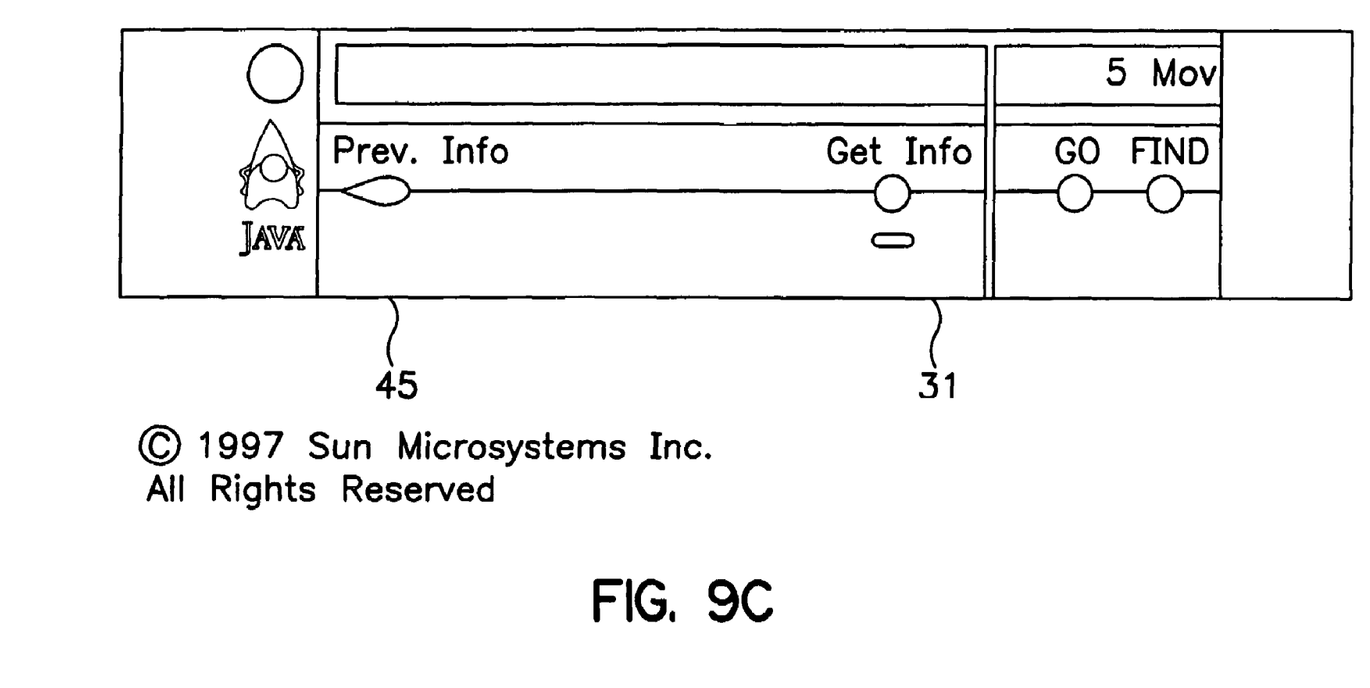

This function is illustrated in FIGS. 9A, 9B and 9C. Each of FIGS. 9A, 9B and 9C represents one frame in the animated sequence just described, in which the sequence progresses chronologically from FIG. 9A to FIG. 9C. As with the progress indicator, the intent here is to convey to the user the impression of a smooth-flowing animation sequence, rather than a series of discrete images. It will also be appreciated that the actual animation sequence will likely include many more frames than are shown.

"Go" Panel

Figure 10:
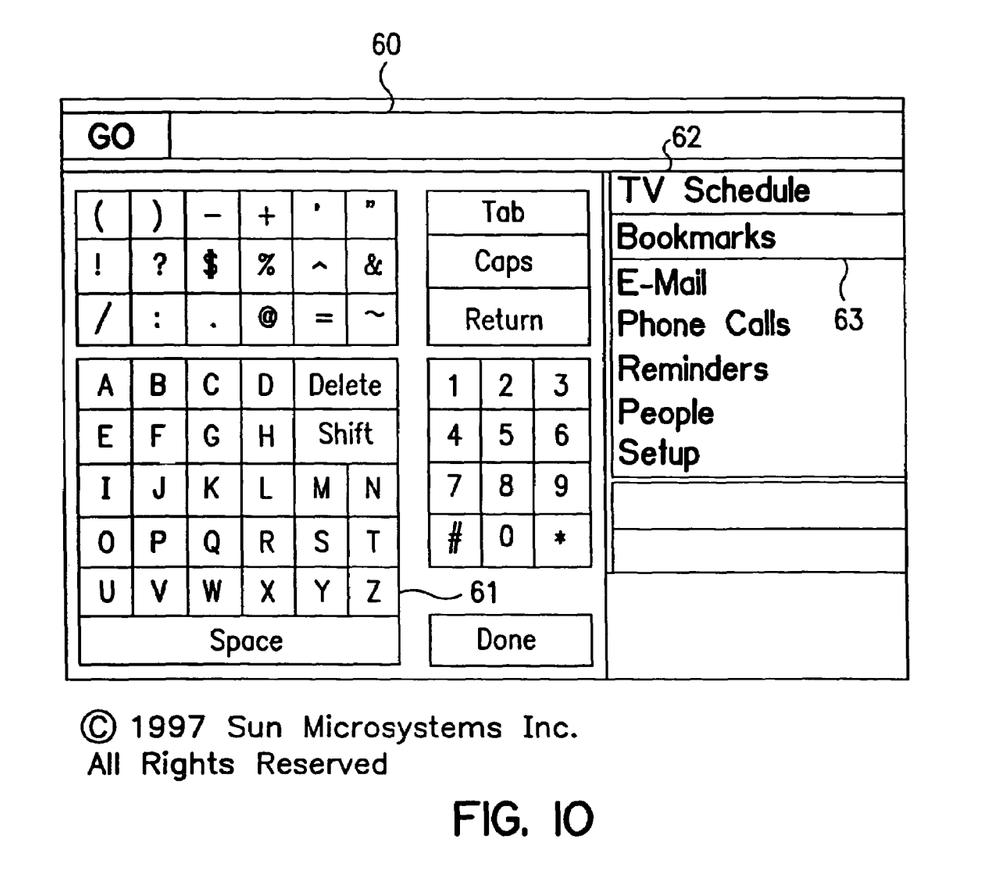
FIG. 10 illustrates a "Go" screen generated by the graphical user interface of the present invention.

The GUI of the present invention allows the user to access the "Go panel", an embodiment of which is shown in FIG. 10, by activating the Go button 31. The Go panel allows the user to enter Internet addresses such as Uniform Resource Locators (URLs) to access Web sites, and to access various system functions from a menu screen. An address is entered by typing the address into input field 60 and then activating a control on remote control 4 to initiate a link to that address. An address may be typed into the input field by using, for example, the on-screen "soft" keyboard 61, which can optionally be displayed as part of the Go panel, or by using a separate, alpha-numeric input device, such as a wireless keyboard (not shown).

The Go panel also includes a menu 62, in which a number of functions provided by the system are displayed (e.g., "TV Schedule", "Bookmarks, "E-mail", etc.). The user can access any of these functions by moving the selection bar 63 to one of these selections using the remote control 4, or by typing the name of the selection in the input field 60, and then entering the selection.

Thus, a user interface for accessing interactive content using a set-top box has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of generating a user interface in a processing system connectable to a display device, the method comprising the steps of:
   displaying an input window on the display device, the input window including a plurality of icons located substantially adjacent to each other along a coordinate axis;
   in response to a user input selecting one of the icons:
      redisplaying the input window, such that at least one of the icons appears to be shifted in position along the coordinate axis; and
      displaying information corresponding to the selected icon adjacent to the selected icon along the coordinate axis.

2. A method according to claim 1, wherein all of the plurality of icons remain visible during the step of displaying information corresponding to the selected icon.

3. A method according to claim 1, further comprising the steps of:
   determining when the selected icon is no longer selected;
   when the selected icon is no longer selected, ceasing to display the information corresponding to the icon in the space adjacent to the icon; and
   redisplaying the input window, such that the plurality of icons are displayed substantially adjacent to each other.

4. A method according to claim 1, further comprising the step of displaying full-motion video images on the display device, wherein the step of displaying the input window comprises the step of displaying the input window over only a portion of the video images.

5. A method according to claim 4, wherein the video images include real-time television images.

6. A method according to claim 5, further comprising the step of receiving hypertext data transmitted from a remote processing system.

7. A method according to claim 1, further comprising the step of receiving a user input selecting one of the icons, the user input having been entered by a user from a remote input device.

8. A method of enabling a client processing system to generate a user interface, the method comprising the step of transmitting sequences of instructions from a host processing system to the client processing system, the sequences of instructions including instructions which, when executed on the client processing system, cause the client processing system to perform the method recited in claim 1.

9. A method of generating a user interface in a processing system connectable to a television set, the processing system for enabling a user to access a wide area computer network using the television set as a display device, the television set having a display area, the method comprising the steps of:
displaying an input field in a first portion of the display area of the television set, the input field for allowing the user to enter characters to specify a function of the processing system which the user wishes to access; and
displaying a menu in a second portion of the display area while displaying the input field, the menu specifying functions of the processing system.

10. A method according to claim 9, wherein the input field is further for allowing a user to enter characters corresponding to an address on the wide area computer network, the address for causing the processing system to communication with a remote processing system corresponding to the address.

11. A method according to claim 10, wherein the input field is further for allowing a user to enter characters specifying a hypertext link.

* * * * *